(12) United States Patent
Swope

(10) Patent No.: US 10,611,372 B2
(45) Date of Patent: Apr. 7, 2020

(54) DUAL-MODE DATA CAPTURE SYSTEM FOR COLLISION DETECTION AND OBJECT DIMENSIONING

(71) Applicant: Zebra Technologies Corporation, Lincolnshire, IL (US)

(72) Inventor: Charles Burton Swope, Coral Springs, FL (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/123,594

(22) Filed: Sep. 6, 2018

(65) Prior Publication Data

US 2020/0079370 A1 Mar. 12, 2020

(51) Int. Cl.
| | |
|---|---|
| *G06T 7/62* | (2017.01) |
| *B60W 30/095* | (2012.01) |
| *B60W 50/14* | (2020.01) |
| *G06T 7/20* | (2017.01) |

(52) U.S. Cl.
CPC ........ *B60W 30/0956* (2013.01); *B60W 50/14* (2013.01); *G06T 7/20* (2013.01); *G06T 7/62* (2017.01); *B60W 2050/143* (2013.01); *B60W 2420/42* (2013.01); *B60W 2420/52* (2013.01); *B60W 2420/54* (2013.01); *G06T 2207/10028* (2013.01); *G06T 2207/30261* (2013.01)

(58) Field of Classification Search
CPC .................. B60W 30/0956; H04W 4/023
See application file for complete search history.

(56) References Cited

U.S. PATENT DOCUMENTS

| | | | |
|---|---|---|---|
| 6,476,812 B1 | 11/2002 | Yoshigahara et al. | |
| 7,660,436 B2 | 2/2010 | Chang et al. | |
| 10,028,102 B2* | 7/2018 | Modica | G01S 13/06 |
| 2005/0232463 A1 | 10/2005 | Hirvonen et al. | |
| 2010/0305857 A1 | 12/2010 | Byrne et al. | |
| 2016/0342850 A1 | 11/2016 | Elimalech et al. | |
| 2018/0053305 A1* | 2/2018 | Gu | G06T 7/90 |

(Continued)

OTHER PUBLICATIONS

International Search Report and Written Opinion for International Application No. PCT/US2019/034674 dated Aug. 22, 2019.

(Continued)

*Primary Examiner* — Qutbuddin Ghulamali
(74) *Attorney, Agent, or Firm* — Yuri Astvatsaturov

(57) ABSTRACT

A dual-mode data capture system includes a capture controller, a point cloud generator, a collision detector, a plurality of cameras viewing a capture volume, and a motion sensor to generate a detection signal when an object arrives at a capture position within the volume. The controller: activates a subset of cameras in a collision detection mode to capture sequences of images of the volume; responsive to receiving the detection signal, activates the cameras in a dimensioning mode to capture a synchronous set of images of the capture position. The collision detector: determines whether the sequences of images indicate a potential collision; and responsive to detection of a potential collision, generates a warning. The point cloud generator: receives the synchronous set of images and generates a point cloud representing the object based on the synchronous set of images, for use in determining dimensions of the object.

23 Claims, 9 Drawing Sheets

(56) References Cited

U.S. PATENT DOCUMENTS

2018/0067487 A1    3/2018  Xu et al.
2018/0148047 A1*   5/2018  Kadetotad ......... B60W 30/0956
2018/0329418 A1*  11/2018  Baalke ............. B60W 50/0097

OTHER PUBLICATIONS

U.S. Appl. No. 15/991,575, filed May 29, 2018.
ForkAlert http://www.forkalert.net/ [retrieved on Sep. 6, 2018] (2017).

* cited by examiner

DUAL-MODE DATA CAPTURE SYSTEM FOR COLLISION DETECTION AND OBJECT DIMENSIONING

BACKGROUND

The transportation and storage of objects such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Systems for automatically measuring package dimensions may also suffer from reduced accuracy, for example, when measuring packages in motion, packages with dark (e.g. black) surfaces, and the like. Such systems may also require the movement of packages with equipment such as forklifts and the like, introducing potential interference risks among package moving equipment during the dimensioning process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
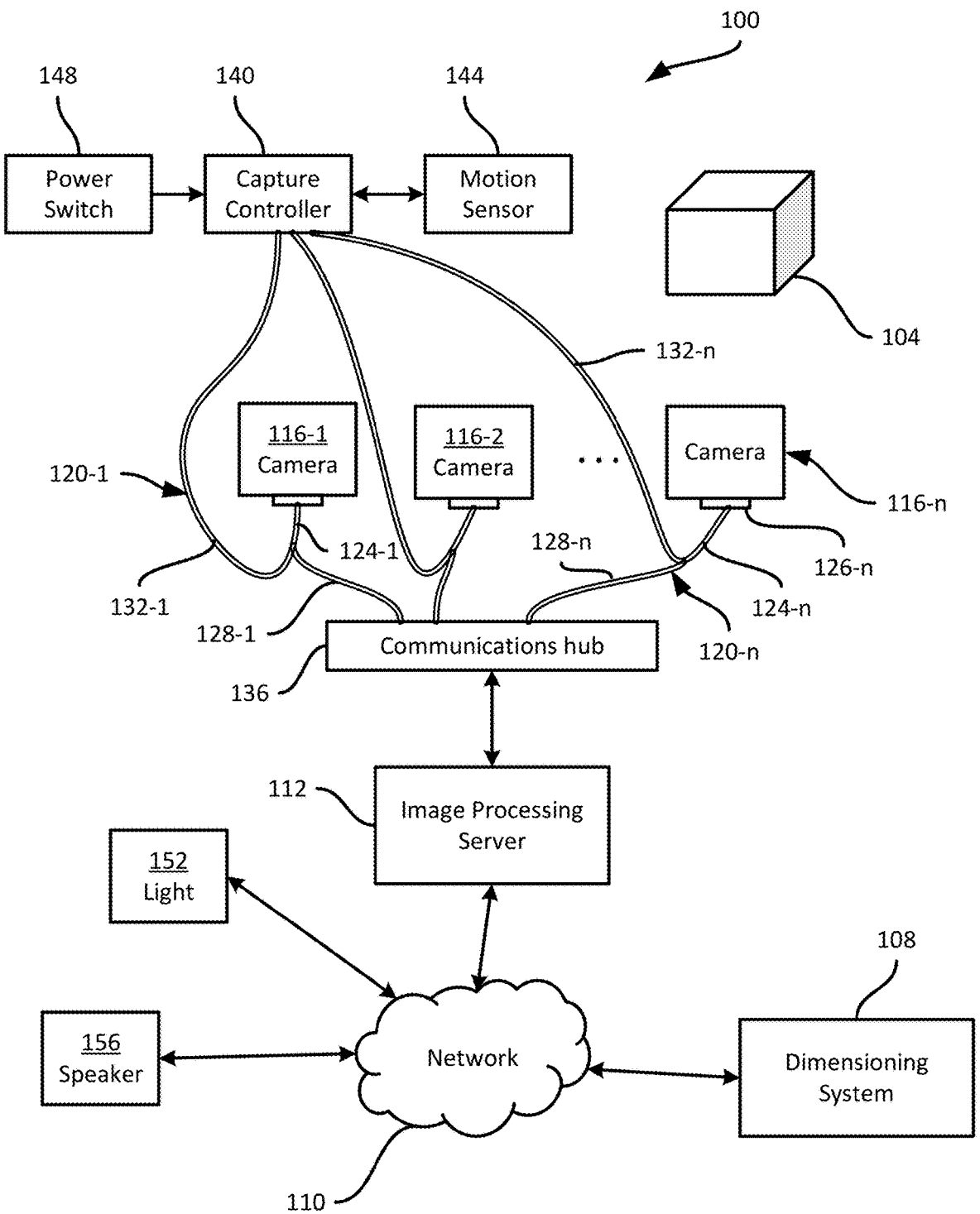
FIG. 1 is a schematic of a dual-mode data capture system for collision detection and object dimensioning.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a dual-mode data capture system, comprising: a plurality of cameras disposed to view a capture volume; a motion sensor configured to generate a detection signal responsive to detecting an object at a capture position within the capture volume; a capture controller connected to the motion sensor and configured to: activate at least a subset of the plurality of cameras in a collision detection mode causing the subset of cameras to capture respective sequences of images of the capture volume; responsive to receiving the detection signal, activate the plurality of cameras in a dimensioning mode causing each camera to capture a respective image of a synchronous set of images of the capture position; a collision detector connected to at least the subset of cameras and configured to: receive the respective sequences of images; determine whether the respective sequences of images from at least the subset of the plurality of cameras indicate a potential collision of one or more objects in the capture volume; and responsive to detection of the potential collision, generate a warning; and a point cloud generator connected to each of the plurality of cameras and configured to receive the synchronous set of images from the cameras and generate a point cloud representing the object based on the synchronous set of images, wherein the dimensions of the object are determined based on the point cloud.

Additional examples disclosed herein are directed to a method of dual-mode data capture, comprising: at a capture controller connected to a plurality of cameras disposed to view a capture volume, activate at least a subset of the plurality of cameras in a collision detection mode causing the subset of cameras to capture respective sequences of images of the capture volume; at a collision detector connected to at least the subset of cameras, receiving the respective sequences of images and determining whether the respective sequences of images from at least the subset of the plurality of cameras indicate a potential collision of one or more objects in the capture volume; responsive to detection of the potential collision at the collision detector, generating a warning; at a motion sensor connected to the capture controller, generating a detection signal responsive to detecting an object at a capture position within the capture volume; at the capture controller, responsive to receiving the detection signal, activating the plurality of cameras in a dimensioning mode causing each camera to capture a respective image of a synchronous set of images of the capture position; and at a point cloud generator connected to each of the plurality of cameras, receiving the synchronous set of images from the cameras and generating a point cloud representing the object based on the synchronous set of images, wherein the dimensions of the object are determined based on the point cloud.

FIG. 1 depicts a dual-mode data capture system 100 for collision detection and object dimensioning. In a dimensioning mode, the data capture system 100 is configured to generate point cloud data depicting an object 104 within a capture volume, and to provide the point cloud data to a dimensioning server 108 (e.g. one or more computing devices) via a network 110. The dimensioning server 108, in turn, is configured to process the point cloud data and determine at least one dimension (e.g. height, width, length or the like) of the object 104. In a collision detection mode, the data capture system 100 is configured to capture image data depicting the above-mentioned capture volume, whether or not the object 104 is present, and to determine whether the image data indicates a potential collision within the capture volume (e.g. between two forklifts manipulating objects, or the like). The data capture system 100 is configured to switch between the collision detection and dimensioning modes under certain conditions, as will be discussed below in greater detail.

The object 104, in the present example, is a package and is therefore also referred to herein as the package 104. For example, the package 104 may be one of a plurality of packages to be dimensioned by the server 108 prior to shipping, storage or the like. The system 100 may, for example, be deployed in a transport and logistics (T&L) facility in which a plurality of packages 104 are moved through the system 100 for data capture and subsequent dimensioning.

The system 100 includes an image processing server 112 (also referred to herein as the server 112) configured to generate the above-mentioned point cloud data representing the package 104. The server 112 is also configured to perform the detection of potential collisions as mentioned above. The image processing server 112 is implemented as a suitable computing device, the components of which will be described in greater detail below. In other examples, as will be discussed further below, the functionality of dimensioning and collision detection may be implemented on separate computing devices.

The server 112 is configured to detect the above-mentioned potential collisions, and to generate the above-mentioned point cloud data representing the package 104, based on images captured by a plurality of cameras 116-1, 116-2, . . . , 116-n (collectively referred to as the cameras 116, and generically referred to as a camera 116; similar nomenclature is employed for other elements herein) arranged with fields of view encompassing a capture volume containing a capture position at which the package 104 is to be dimensioned. The cameras 116, in the present example, are color cameras (e.g. configured to generate images files containing RGB data), such as digital single-lens reflex (DSLR) cameras. In other examples, the cameras 116 can include one or more grayscale cameras, infrared cameras, or the like. In addition, camera formats other than the above-mentioned DSLR format may be implemented.

In the dimensioning mode, the cameras 116 are configured to capture a synchronous set of images from which the above-mentioned point cloud data is generated. A synchronous set of images as referred to herein contains one image captured by each camera, at substantially the same time. For example, the images in a synchronous set of images may be captured within a time period of about 0.5 seconds or less. In some embodiments, the images in a synchronous set of images may be captured within a time period of about 0.2 seconds or less. Thus, each image in the set depicts the package 104 at substantially the same instant in time, but from a different viewing position than the other images as a result of the differing physical positions of the cameras 116 relative to the capture volume.

In the collision detection mode, on the other hand, the cameras 116 are configured to capture respective sequences of images, rather than a single image per camera 116. The sequences of images captured by the cameras 116 can be captured as individual frames (e.g. discrete image files for each image in the sequence), or as video streams (e.g. a single video file for each sequence of images).

The images employed by the server 112 to generate point cloud data and perform collision detection are transferred to the server 112 by the cameras 116, in the present example, via a set of dual connectors 120-1, 120-2, . . . , 120-n. Each dual connector 120 includes a camera segment 124 configured to engage with a communications port 126 of the corresponding camera 116. The communications port 126 includes a set of control contacts (e.g. pins or other suitable electrical contacts) and a set of data transfer contacts. For example, the data transfer contacts can be based on the Universal Serial Bus (USB) standard. An example of a communications port 126 is a Sony™ Multiport (also referred to as Multi Terminal) port, which includes five USB contacts and ten control contacts.

The camera segment 124 of each dual connector 120 includes electrical conduits corresponding to both the above-mentioned data transfer contacts and control contacts. Each dual connector 120 also includes a transfer segment 128 and a control segment 132. As shown in FIG. 1, the segments 128 and 132 split from the camera segment 124. In particular, the transfer segment 128 contains the above-mentioned data transfer conduits, while the control segment 132 contains the above-mentioned control conduits.

In embodiment illustrated in FIG. 1, therefore, the cameras 116 are configured to transfer captured images to the server 112 via the dual connectors 120 (and specifically via the camera segments 124 and the transfer segments 128). The system 100 also includes a communications hub 136, such as a USB hub, connecting the transfer segments 128 to the server 112 (e.g. to a single USB port of the server 112). In other examples, the communications hub 136 is omitted and the transfer segments 128 are connected directly to the server 112, for example where the server 112 includes a sufficient number of ports (e.g. USB ports) to accommodate the transfer segments 128.

The cameras 116 are configured to capture images responsive to commands issued to the cameras over the control segments 132 of the dual connectors 120. In particular, the system 100 includes a capture controller 140 configured to receive each of the control segments 132, and to transmit commands over the control segments 132 to the cameras 116.

The capture controller 140 is implemented as a suitable computing device, such as one or more single-board microcontrollers (e.g. Raspberry Pi™). In other examples, the controller 140 can be implemented as a desktop computer, a laptop computer, a tablet computer, or the like. The capture controller 140 is configured to generate control signals for transmission to the cameras 116, including commands for switching between the above-mentioned dimensioning and collision detections modes. Such commands include a synchronous shutter command that is generated in response to an object detection signal received at the controller 140.

The object detection signal, in the present example, is generated by a motion sensor 144 configured to detect the arrival of the package 104 at a capture position in the capture volume. The motion sensor 144 includes any suitable motion sensing device, such as a light detection and ranging (lidar) device, an ultrasound sensor, a further camera and associated image processor configured to detect the presence of the package 104, or the like. The motion sensor 144 is connected to the controller 140 via a suitable communications link (e.g. USB, I2C interface, or the like).

The system 100 also includes a power switch 148 connected to the capture controller 140. The power switch 148 is, in the present example, a manually operable switch configured to cause the controller 140 to send control commands to the cameras 116 to power on or off. The controller 140 can also be configured to power the motion sensor 144 on or off responsive to operation of the power switch 148. In other embodiments, the power switch 148 can be omitted or replaced with a soft switch implemented in software executed by the controller 140 and operated via manipulation of an input device (e.g. a keyboard, touch screen, microphone or the like).

The system 100 further includes one or more output devices configured to generate warning signals responsive to detection of a potential collision by the server 112. For example, the system 100 as illustrated includes a warning light 152 and a speaker 156 connected to the network 110. In other embodiments one or both of the warning light 152 and the speaker 156 are connected directly to the server 112 (e.g. via USB, Bluetooth™ or another suitable local communications link).

Figure 2:
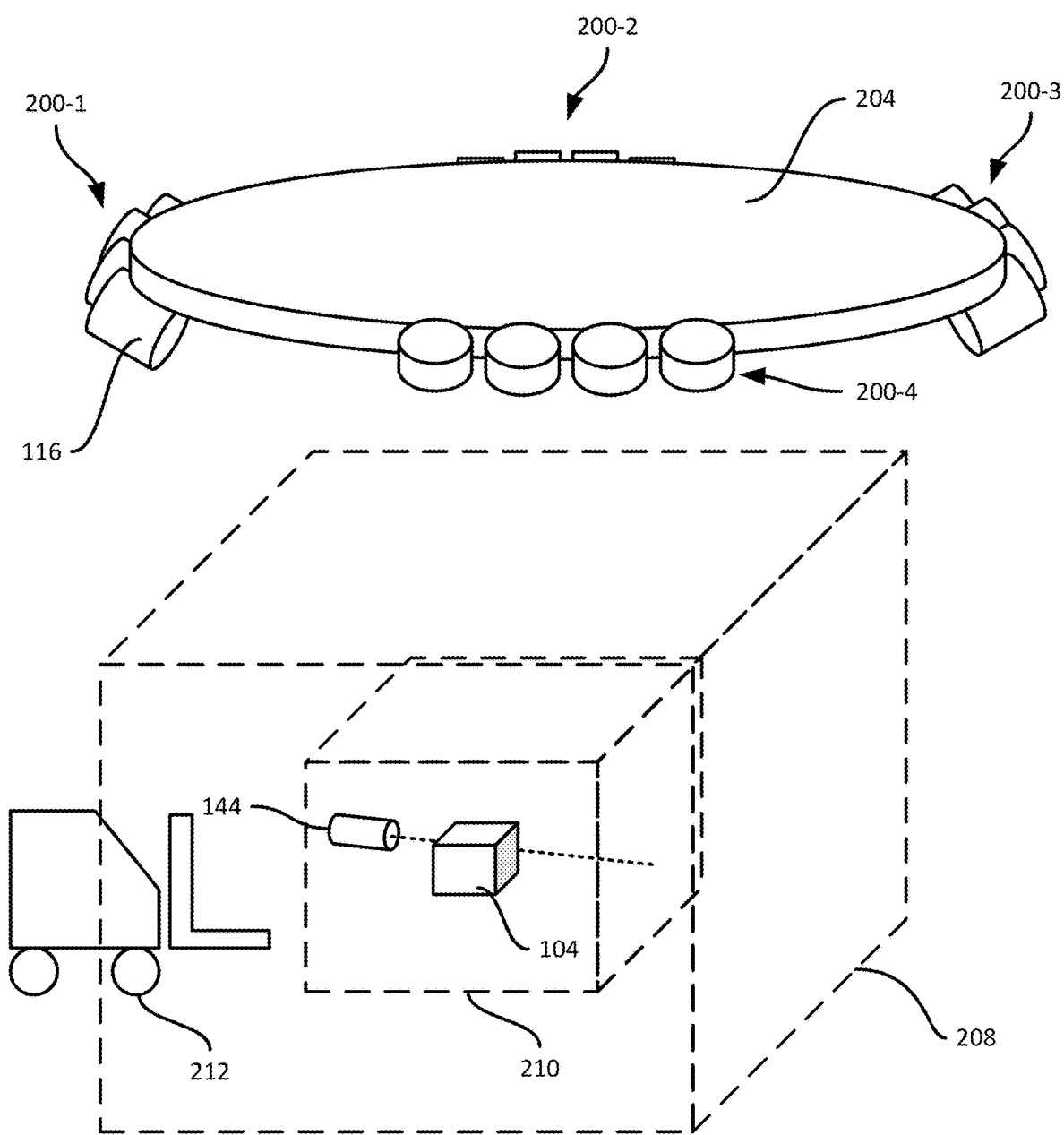
FIG. 2 is a diagram of an example deployment of certain components of the system of FIG. 1.

Turning to FIG. 2, certain components of the system 100 are shown in an example deployment. The example deployment shown in FIG. 2 includes sixteen cameras 116, arranged in four groups 200-1, 200-2, 200-3 and 200-4, with each group 200 including four cameras 116. As will be apparent from FIG. 2, the spacing of the cameras 116 within each group 200 is smaller than the spacing between adjacent groups 200.

The cameras 116 are supported on a support structure 204 (e.g. about the perimeter of the support structure 204), such as a substantially annular frame, which may be suspended from a ceiling (not shown) of the facility in which the system 100 is deployed. A wide variety of other support structures may also be employed to support the cameras 116, including discrete support structures for each group 200, or for each camera 116. In other embodiments, the cameras 116 are equally spaced about the support structure 204. In further embodiments, other numbers of cameras 116 may be deployed. For example, another deployment may employ twelve cameras 116 disposed about the support structure 204 in three groups of four, or in four groups of three.

The cameras 116 are positioned by the support structure 204 such that the field of view of each camera 116 encompasses at least a portion of a capture volume 208. Further, the fields of view of adjacent cameras 116 within each group 200 overlap by about 40%. Together, the cameras 116 thus provide substantially complete coverage of a capture position 210 within the capture volume 208 (e.g. each position at the capture position 210 is within the field of view of at least two cameras 116). In the present example, the capture position 210 is defined as a volume with a height, a width and a length of about eight feet each; the cameras 116 may be arranged to encompass various other capture positions in other embodiments, for example depending on the size of package 104 to be captured. The capture volume 208, as evidenced in FIG. 2, is larger than the capture position (i.e. the capture position is a sub-volume of the capture volume 208). The cameras 116 may provide reduced coverage of the capture volume 208 in comparison to the capture position 210. Preferably, however, each position in the capture volume 210 is within the field of view of at least one of the cameras 116.

The package 104 may be transported through the capture volume 208, for example on a vehicle such as a forklift 212, or via another suitable locomotive mechanism (e.g. a conveyor belt or the like). The motion sensor 144 is therefore deployed, as shown in FIG. 2, in the path along which the package 104 is transported, to detect the arrival of the package 104 at the predefined capture 210 within the capture volume 208. Upon arrival of the package 104 at the capture position 210, the motion sensor 144 is configured to generate the above-mentioned detection signal.

Before a detailed discussion of the operation of the system 100, certain internal components of the server 112 and the controller 140 will be discussed with reference to FIGS. 3A and 3B.

Figure 3A:
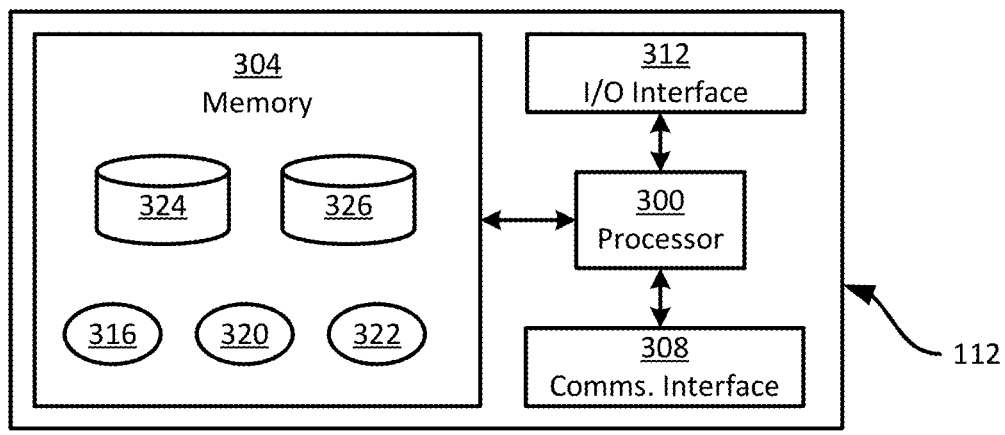
FIG. 3A is a block diagram of certain internal components of the image processing server of FIG. 1.

Referring to FIG. 3A, certain internal components of the server 112 are shown. The server 112 includes a central processing unit (CPU), also referred to as a processor 300, interconnected with a non-transitory computer readable storage medium, such as a memory 304. The memory 304 includes any suitable combination of volatile (e.g. Random Access Memory (RAM)) and non-volatile (e.g. read only memory (ROM), Electrically Erasable Programmable Read Only Memory (EEPROM), flash) memory. The processor 300 and the memory 304 each comprise one or more integrated circuits (ICs).

The server 112 also includes a communications interface 308, enabling the server 112 to exchange data with other computing devices, such as the dimensioning server 108, via the network 110. The communications interface 308 therefore includes any suitable hardware (e.g. transmitters, receivers, network interface controllers and the like) allowing the server 112 to communicate over the network 110.

The server 112 further includes an input/output interface 312, which may also be referred to as a local communications interface, enabling the server 112 to exchange data with devices such as the cameras 116. In the present example, the interface 312 includes a USB interface connected to the hub 136. Other suitable interface technologies may also be employed for the interface 312, including Ethernet, Wi-Fi, Thunderbolt™ and the like).

The server 112 can also include input devices (e.g. a keyboard, a mouse, a microphone, or the like) and output devices (e.g. a display, a speaker or the like), not shown. The components of the server 112 are interconnected by communication buses (not shown), and powered by a battery or other power source, over the above-mentioned communication buses or by distinct power buses (not shown).

The memory 304 of the server 112 stores a plurality of applications, each including a plurality of computer readable instructions executable by the processor 300. The execution of the above-mentioned instructions by the processor 300 causes the server 112 to implement certain functionality, as discussed herein. The applications are therefore said to be configured to perform that functionality in the discussion below. In the present example, the memory 304 of the server 112 stores a monitoring application 316, a point cloud generator application 320, and a collision detection application 322 (also referred to herein simply as the applications 316, 320 and 322, respectively).

The server 112 is configured, via execution of the application 316 by the processor 300, to monitor the contents of a first common image repository 324 in the memory 304 (e.g. a database, folder or the like) for changes thereto, and to cause the point cloud generator application 320 to initiate point cloud generation based on the contents of the repository 324 when changes are detected. The application 320 is a suitable point cloud generation application, such as Agisoft PhotoScan. The server 112 is further configured, via execution of the collision detection application 322, to detect potential collisions in the capture volume 208 by comparing images in a second image repository 326 to which the cameras 116 are configured to transmit images in the collision detection mode.

The applications 316, 320 and 322 can, in other examples, be implemented as a single application, two applications, or as more than three applications. In other examples, the processor 300, as configured by the execution of the applications 316, 320 and 322, is implemented as one or more specifically-configured hardware elements, such as field-programmable gate arrays (FPGAs) and/or application-specific integrated circuits (ASICs).

Figure 3B:
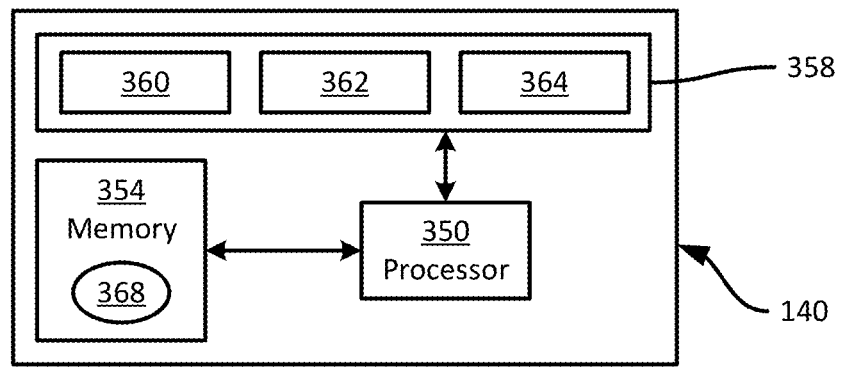
FIG. 3B is a block diagram of certain internal components of the capture controller of FIG. 1.

Referring to FIG. 3B, certain internal components of the controller 140 are shown. The controller 140 includes a central processing unit (CPU), also referred to as a processor 350, interconnected with a non-transitory computer readable storage medium, such as a memory 354. The memory 354 includes any suitable combination of volatile (e.g. Random Access Memory (RAM)) and non-volatile (e.g. read only memory (ROM), Electrically Erasable Programmable Read Only Memory (EEPROM), flash) memory. The processor 350 and the memory 354 each comprise one or more integrated circuits (ICs).

The controller 140 further includes an input/output interface 358, enabling the controller 140 to exchange data with devices such as the cameras 116 and the motion sensor 144. In the present example, the interface 358 includes an array of general purpose input/output (GPIO) pins (e.g. at least one set of 40 GPIO pins). The interface 358 can also include one or more USB ports or the like. A first portion 360 of the interface 358 (e.g. a first subset of the GPIO pins) is connected to the power switch 148. A second potion 362 of the interface 358 (e.g. a second subset of the GPIO pins, or a USB port) is connected to the motion sensor 144. A third portion 364 of the interface 358 (e.g. a third subset of the GPIO pins) is connected to the cameras 116. That is, the third portion 364 establishes connections between the controller 140 and the control segment 132 of each dual connector 120. Thus, in the present example, the third portion 364 establishes sixteen connections (to each of the sixteen cameras 116), each connection having a sufficient number of contacts (e.g. GPIO pins) to transmit the commands discussed in greater detail below to the cameras 116.

The controller 140 can also include a further communications interface (not shown) including a suitable combination of transmitters, receivers, network interface controllers and the like, and enabling the controller 140 to communicate with other computing devices, e.g. via the network 110.

The controller 140 can also include input devices (e.g. a keyboard, a mouse, a microphone, or the like) and output devices (e.g. a display, a speaker or the like), not shown. The components of the controller 140 are interconnected by communication buses (not shown), and powered by a battery or other power source, over the above-mentioned communication buses or by distinct power buses (not shown).

The memory 354 of the controller 140 stores a plurality of applications, each including a plurality of computer readable instructions executable by the processor 350. The execution of the above-mentioned instructions by the processor 350 causes the controller 140 to implement certain functionality, as discussed herein. The applications are therefore said to be configured to perform that functionality in the discussion below. In the present example, the memory 354 of the controller 140 stores a capture control application 368 (also referred to herein as the application 368).

The controller 140 is configured, via execution of the application 368 by the processor 350, to receive object detection signals from the motion sensor 144, and in response to control the cameras 116 according to one of a collision detection mode and a dimensioning mode, to capture images and transfer the images to the server 112 for storage in the repository 324 (in the dimensioning mode) or the repository 326 (in the collision detection mode) and subsequent processing.

The application 368 can, in other examples, be implemented as a plurality of logically distinct applications. In other examples, the processor 350, as configured by the execution of the application 368, is implemented as one or more specifically-configured hardware elements, such as field-programmable gate arrays (FPGAs) and/or application-specific integrated circuits (ASICs).

Figure 4:
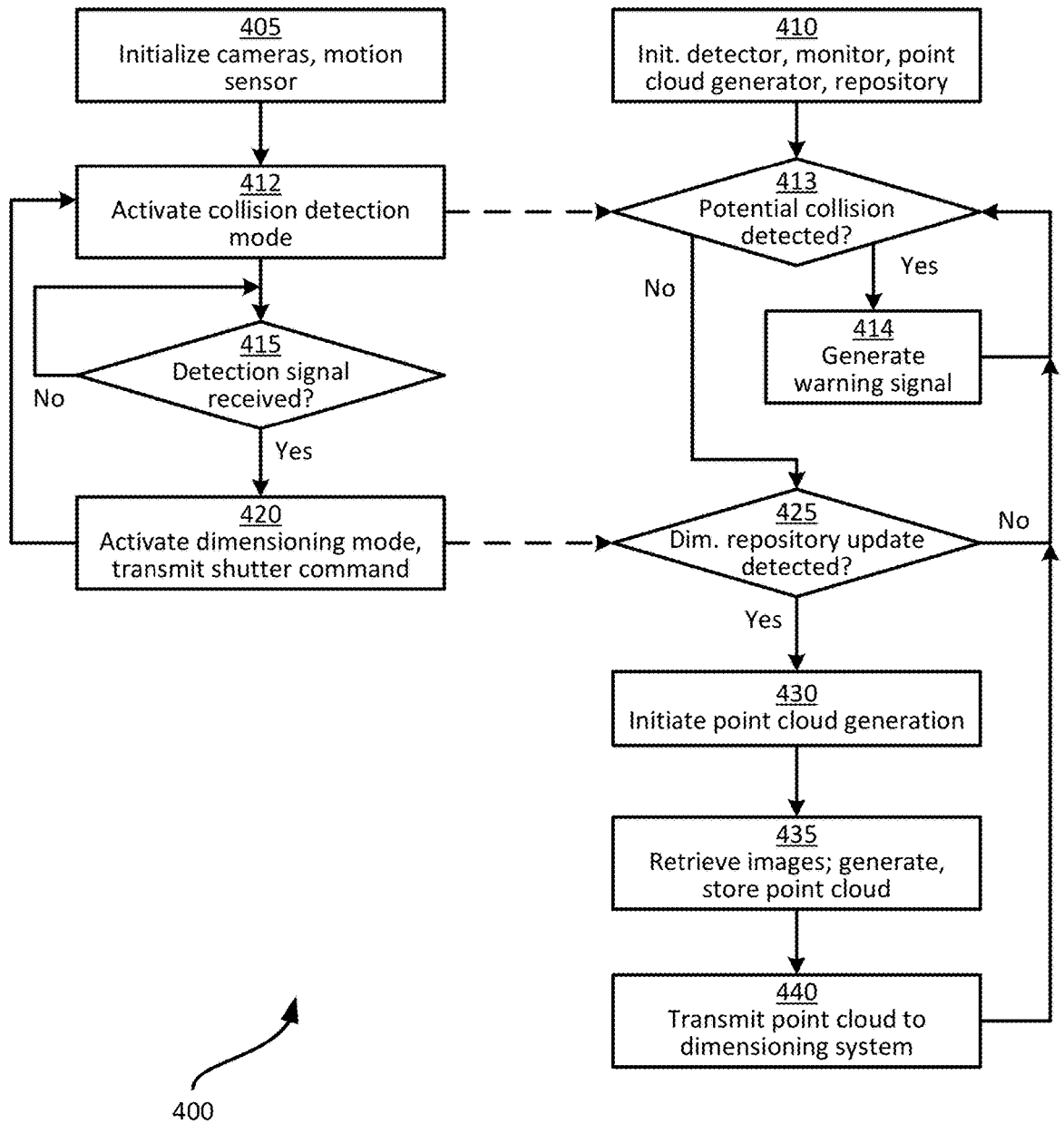
FIG. 4 is a flowchart of a method of dual-mode data capture for collision detection and object dimensioning.

Turning now to FIG. 4, a method 400 of data capture for object dimensioning is illustrated. The method 400 will be described in conjunction with its performance in the system 100, as discussed above in connection with FIGS. 1, 2 and 3A-3B. In particular, the method 400 illustrates actions taken by the capture controller 140 and the server 112 to capture images of a package 104 within the capture volume 208, and to generate a point cloud representing the package 104 for transmission to the dimensioning server 108.

Beginning at block 405, the controller 140 is configured, via execution of the application 368, to initialize the cameras 116 and the motion sensor 144. For example, the controller 140 is configured to detect an activation of the power switch 148 (e.g. via the first portion 360 of the interface 358) and in response, to transmit power-on commands to the motion sensor 144 (e.g. via the second portion 362 of the interface 358) and each of the cameras 116 (e.g. via the third portion 364 of the interface 358).

At block 410, the server 112 is configured to initiate execution of the monitor application 316, the point cloud generator application 320 and the collision detection application 322. Initiation of execution of the point cloud generator application 320 may include loading of calibration data corresponding to the cameras 116. The calibration data defines the physical positions and orientations (e.g. pitch, roll and yaw) of the cameras 116 relative to a predefined frame of reference (e.g. a coordinate system representing the capture volume 208).

The server 112 may also be configured at block 410, along with initiating execution of the application 320, to initialize the first common repository 324. More specifically, the server 112 can be configured to populate the repository 324 with an initial set of images representing the capture volume 208. The initial set of images may represent the capture volume 208 in the absence of a package 104. Various mechanisms can be implemented to initialize the repository 324. For example, a static set of initial images can be stored in the memory 304, and at block 410 the server 112 can be configured (e.g. via execution of the application 320) to clear the contents of the repository 324 and write a copy of the initial image set into the repository. In another example, the controller 140 can be configured, upon detection of an activation of the power switch 148, to not only send a power-on command to the cameras 116, but to also send a shutter command to the cameras 116, causing the cameras 116 to capture an initial image set and transfer the initial image set to the server 112 for storage in the repository 324.

When the repository 324 is initialized at block 410, the server 112 can also be configured to generate an initial point cloud based on the initial image set in the repository 324. Generation of a point cloud from a set of two-dimensional images is performed according to any suitable conventional mechanism, and is not discussed in detail herein. The initial point cloud, when generated, is stored in the memory 304 (e.g. in the repository 324). The initialization of the repository 324 and the generation of an initial point cloud as described above may accelerate the generation of point cloud data representing packages 104 later in the performance of the method 400. For example, the application 320 may be configured to generate subsequent point cloud data by detecting portions of subsequent image sets that match the initial point cloud and re-using corresponding portions of the initial point cloud. In other embodiments, initialization of the repository 324 and generation of an initial point cloud at block 410 can be omitted.

At block 412, having initialized the cameras 116 and the motion sensor 144, the controller 140 is configured to activate at least a subset of the cameras 116 in the collision detection mode. As mentioned above, in the collision detection mode, the cameras 116 are configured to capture respective sequences of images. That is, each camera 116 of the above-mentioned subset is configured to capture a plurality of images in sequence. The subset of cameras 116 activated in the collision detection mode at block 412 is preconfigured, for example as a set of camera identifiers in the memory 354. In the present example, the subset of cameras 116 activated at block 412 includes at least four of the cameras 116 (e.g. one camera 116 from each of the groups 200 illustrated in FIG. 2). Subsets including other numbers of cameras 116 are also contemplated, up to and including all of the cameras 116.

For example, each camera 116 of the subset can be configured to capture a sequence of images at the rate of thirty frames per second, although it will now be apparent that the cameras 116 can also be configured to capture images at other suitable frame rates, including those below thirty (e.g. twenty frames per second) and those above thirty (e.g. 150 frames per second).

Activation of the subset of cameras 116 at block 412 by the controller 140 includes transmitting a command from the controller 140 to each camera 116 of the subset, causing the camera to transfer the captured sequence of images to the second repository 326 at the server 112, rather than to the first repository 324. For example, the controller 140 can be configured to transmit a command to each camera 116 in the subset including a path identifier (e.g. a uniform resource locator, URL, or the like) corresponding to the repository 326. Each camera 116 receiving the command is thus configured to transfer any images captured to the repository 326. The controller 140 can also be configured to employ other mechanisms for causing the cameras 116 to transfer images to the repository 326. For example, the controller 140 can be configured to transmit a command to the cameras 116 of the subset to transfer images via a different output interface than the dual connectors 120. The other output interface can include, for example, a high-definition multimedia interface (HDMI) connection between each camera 116 and the server 112, as will be discussed below in greater detail.

At block 412, the controller 140 can also be configured to transmit a command to each camera 116 of the subset causing the camera 116 to switch between a single-frame capture mode and continuous capture mode. In a single-frame capture mode, each camera 116 captures a single image in response to a single shutter command. In a continuous capture mode, however, each camera 116 is configured to capture a continuous stream of images (e.g. at the above-mentioned frame rate), without requiring successive shutter commands for each image. Thus, at block 412 the controller 140 can transmit to each camera 116 of the subset (e.g. via the dual connectors 120) a command to switch from single-capture to continuous capture (which may also be referred to as a video capture mode).

In other examples, rather than switching the capture modes of the cameras 116 as described above, the controller 140 can be configured to transmit a sequence of shutter commands to each camera 116, such that the cameras capture sequences of images while remaining in a single capture mode. In still further examples, the controller 140 can transmit a frame rate parameter to the cameras 116 (e.g. to set the frame rate to thirty for the collision detection mode), causing the cameras 116 to capture a sequence of frames at the specified frame rate. The frame rate parameter can be stored in the memory 354 and retrieved during the initialization at block 405. The above implementation, in which the cameras 116 remain in the same capture mode rather than switching from a single-frame capture mode to a continuous capture mode, may be particularly suitable for cameras 116 capable of capturing single frames at frame rates exceeding about 20 frames per second. Examples of such cameras include global shutter-equipped area-scan cameras (in contrast to the DLSR cameras noted above, which typically include rolling shutters).

As will be apparent from FIG. 1 and FIG. 4, the server 112 is not directly notified of the activation of the subset of cameras 116 in the collision detection mode. The server 112 is configured, via execution of the collision detection application 322, to monitor the contents of the second repository 326 and to thereby detect the addition of images to the repository 326. The server 112 is therefore configured, at block 413, following activation of the cameras 116 in the collision detection mode by the controller 140, to detect the resulting sequences of images (e.g. four video files, each captured by one of the cameras 116) in the repository 326. The server 112 is further configured to determine, from the contents of the repository 326, whether the sequences of images captured by the cameras 116 indicate a potential collision within the capture volume 208.

At block 413, the server 112 (via execution of the collision detection application 322) can be configured to compare adjacent images in each sequence to perform the determination. For example, the server 112 can be configured to perform an object detection operation on each image in the sequence, to identify one or more objects appearing in at least two images of the sequence. The server 112 can be further configured, following detection of an object in a sequence, to determine a movement vector of the object, defining the direction and speed of movement of the object based on the position of the object within the image sequence.

The server 112 is therefore configured to detect and determine movement vectors for any moving objects within the capture volume at block 413. Having performed the object detection and movement vector determination, the server 112 is then configured to determine whether any of the objects, according to the corresponding movement vectors, will collide within a predetermined time period (e.g. within the next five seconds) if the objects maintain their current movement vectors.

Figure 5A:
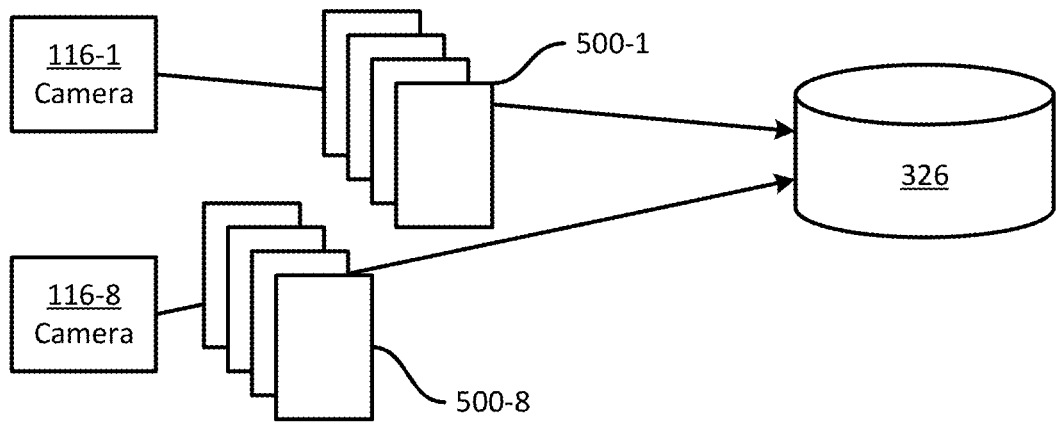
FIGS. 5A-5B illustrate the capture and processing of image sequences in the collision detection mode of the system of FIG. 1.
Figure 5B:
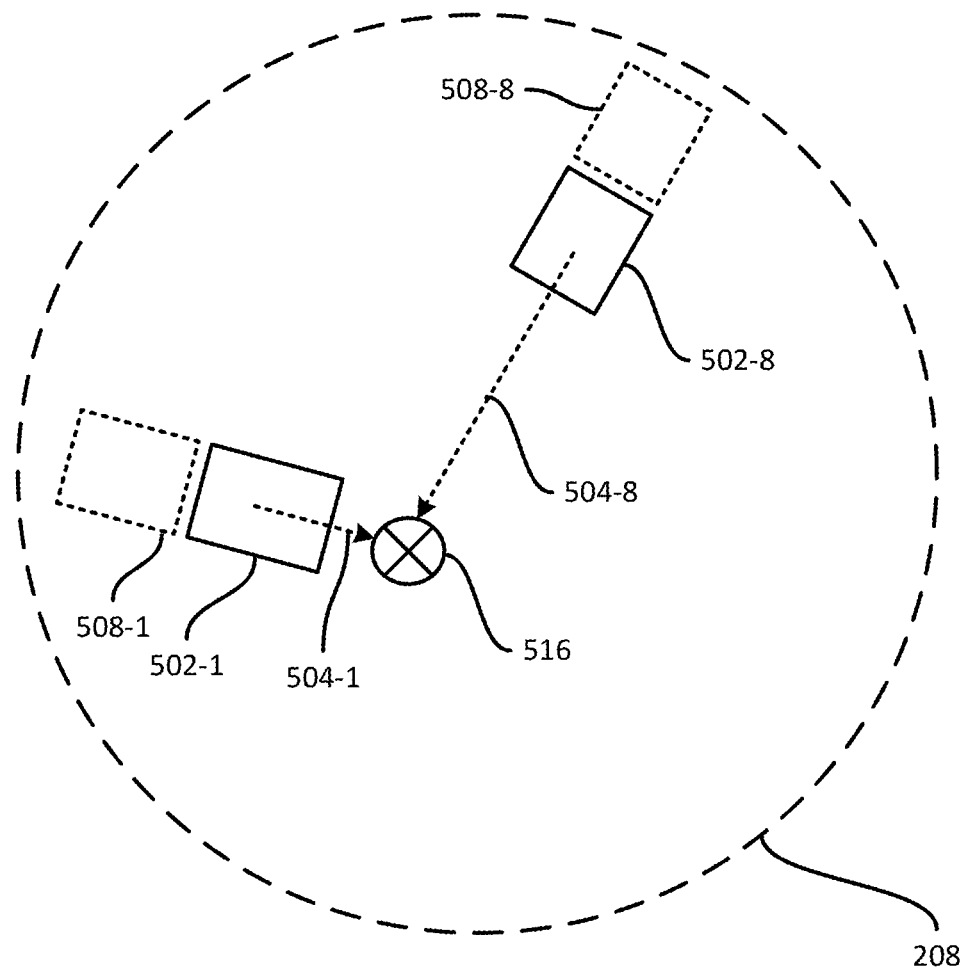

Referring to FIG. 5A, a sequence of images (e.g. a plurality of discrete frames, or a video stream) 500-1 is illustrated as being transferred from the camera 116-1 to the repository 326, while another sequence of images 500-8 is illustrated as being transferred from the camera 116-8 to the repository 326. FIG. 5B illustrates an overhead schematic view of the capture volume 208 as depicted in the sequences 500-1 and 500-8. Specifically, as shown in FIG. 5B the server 112 has identified a first object (e.g. a forklift or the like) 502-1 from the sequence 500-1, and a further object (e.g. another forklift or the like) 502-8 from the sequence 500-8. In other examples, the server 112 can be configured to identify objects across multiple sequences of images. Various suitable mechanisms for object recognition and movement vector generation from sequences of images will occur to those skilled in the art. Examples of such mechanisms include object recognition based on features such as a histogram of oriented gradients (HOG), and the like.

Respective movement vectors 504-1 and 504-8 are determined by the server 112, for example from previous positions 508-1 and 508-8 of the objects 502-1 and 502-8 as depicted in the sequences of images 500-1 and 500-8. As seen from the movement vectors 504-1 and 504-8, the objects 500 and 504 are both travelling into the capture volume 208, with the object 502-8 travelling at a greater speed than the object 502-1. Therefore, if both objects maintain the movement vectors 504-1 and 504-8, a collision will occur at the location 516. The determination at block 413 is therefore affirmative in the present example.

Returning to FIG. 4, responsive to an affirmative determination at block 413, the server 112 is configured at block 414 to generate a warning signal. The generation of a warning signal can include activation of either or both of the light 152 (e.g. to flash) and the speaker 156 (e.g. to play a siren sound). The generation of a warning signal can also include the transmission of a message (e.g. an SMS message or the like) from the server 112 to a computing device associated with either or both of the objects 502. For example, the server 112 can be configured to detect an identifier of each object 502 (e.g. forklifts or other vehicles may be configured to broadcast or otherwise transmit vehicle identifiers) and to transmit a message to a mobile computer mounted on or in each forklift warning of the potential collision. Various other warning signals will also occur to those skilled in the art. Following the performance of block 414, the server 112 returns to block 413 to continue monitoring for collisions. When the determination at block 413 is negative, the server 112 proceeds to block 425, to be discussed in greater detail below.

At block 415, following activation of the collision detection mode at block 412, the controller 140 is configured to determine whether an object detection signal has been received from the motion sensor 144 indicating the presence of an object (e.g. the package 104) at the capture position 210 within the capture volume 208. Referring briefly to FIG. 2, such a detection signal is generated by the motion sensor 144 when the package 104 breaks the beam of light (e.g. laser, IR, or the like) emitted by the motion sensor 144. In some examples, the functionality of the motion sensor can be implemented by the server 112, via execution of the collision detection application 322. In particular, the object detection mechanism implemented by the collision detection application 322 can be employed to identify certain types of objects (e.g. rectangular boxes within predefined size thresholds). Responsive to identification of an object at a predefined position within the capture volume 208 (e.g. within the sub-volume corresponding to the capture position 210), the server 112 can be configured to transmit a detection signal to the controller 140.

When the determination at block 415 is negative, the controller 140 is configured to repeat the performance of block 415. As will now be apparent, during the performance of block 415, the cameras 116 activated in collision detection mode at block 412 continue to operate in collision detection mode. That is, the collision detection functionality of the system 100 can operate in parallel with the determination of whether to initiate a dimensioning operation. When the determination at block 415 is affirmative, however, the controller 140 is configured to proceed to block 420.

At block 420, the controller 140 is configured to activate the cameras 116 in the dimensioning mode. In the present example, at block 420 all of the cameras 116 are activated in the dimensioning mode, including those in the subset employed in the collision detection mode. Activating the cameras 116 in the dimensioning mode includes transmitting a command from the controller 140 to each camera 116 (e.g. via the dual connectors 120), causing each camera 116 to transfer any captured images to the first repository 324 at the server 112, rather than to the second repository 326. As noted in connection with block 412, the controller 140 can be configured to transmit, to each camera 116, a command that includes a path identifier (e.g. a uniform resource locator, URL, or the like) corresponding to the repository 324. Each camera 116 is thus configured to transfer any images captured to the repository 324.

In other examples, the controller 140 can be configured to employ other mechanisms for causing the cameras 116 to transfer images to the repository 324. For example, the controller 140 can be configured to transmit a command to each camera 116 to transfer images via an output interface distinct from the output interface employed in connection with the collision detection mode. The performance of block 420 can, in such examples, include sending a command from the controller 140 to each camera 116 for causing the cameras 116 to transfer images over a USB interface (e.g. the segments 124 and 128 of the dual connectors 120) rather than an HDMI interface employed to transfer video in the collision detection mode.

Having activated the cameras 116 in the dimensioning mode, the controller 140 is configured to generate a shutter command and transmit the shutter command to each camera 116. More specifically, the shutter command is applied substantially simultaneously to every control segment 132 connected to the third portion 364 of the interface 358, such that the cameras 116 receive the shutter command at substantially the same time. For example, the cameras 116 can receive the shutter command within a total time period of about 0.2 seconds, as noted earlier. The time period over which every camera 116 receives the shutter command may be selected based in part on the speed at which the object 104 moves through the capture volume (e.g. as detected via the collision detection mode, based on a known speed of a conveyor belt, or the like). As will be apparent to those skilled in the art, greater speeds of movement of the package 104 may require that the shutter command be received at all cameras 116 within a shorter time period. The example time periods mentioned herein correspond to package movement speeds of up to about 8 mph.

The nature of the shutter command is dependent on the capabilities of the cameras 116. For example, the port 126 of each camera may include shutter control contacts, as well as auto-focus contacts, flash activation contacts, and the like. The control segments 132 include conduits corresponding to the above-mentioned contacts, and the shutter command can therefore include a signal applied to one or more of the conduits (e.g. a high voltage to indicate activation of a shutter, flash or the like, or a low voltage to indicate non-activation). In the present example, the shutter command includes a shutter activation signal and an auto-focus activation signal, instructing each camera 116 to simultaneously trigger the auto-focus and shutter. In some embodiments, the shutter command can be omitted at block 420. For example, certain cameras 116 (e.g. global shutter-equipped area-scan cameras) may be configured to continuously capture image frames in the absence of shutter commands, and at block 420 the controller 140 may send only the command to transfer the next image captured to the repository 324.

Having generated and transmitted the shutter command, the controller 140 is configured to return to block 412, in which the subset of cameras 116 mentioned above is returned to the collision detection mode until a subsequent detection signal is received at block 415. As will now be apparent to those skilled in the art, for some configurations of the motion sensor 144, a given package 104 may cause the generation of more than one detection signal by the motion sensor 144. The controller 140 can therefore be configured to delay the next performance of block 415 for a predefined time period, to permit the package 104 to clear the detection range of the motion sensor 144. For example, for a capture position 210 having a length of about 8 feet as mentioned above, and a package movement speed of about 8 mph, the controller 140 can be configured to ignore any detection signals received from the motion sensor within about 0.3 seconds of a performance of block 420.

Responsive to the performance of block 420 by the controller 140, each camera 116, upon receiving the shutter command, is configured to execute the shutter command (e.g. by activating auto-focus and the shutter, as mentioned above) to capture an image. Each camera 116 is further configured to automatically transfer the captured image to the server 112 via the corresponding camera segment 124 and the transfer segment 128. Thus, in the present example, the server 112 is configured to receive a synchronous set of images for storage in the repository 324 via the communications hub 136.

In the present example, each camera 116 is also configured to assign a static file name, specific to that camera 116, to any captured images. That is, each set of synchronous images captured by the cameras 116 bears the same set of file names. Thus, the transfer of the captured images in each synchronous image set to the repository 324 overwrites any previous set of images stored in the repository 324. Overwriting the files in the repository 324 rather than writing new files to the repository 324 may accelerate post-processing of the images, for example by permitting the point cloud generator 320 to maintain a static list of file names to be processed rather than performing a discovery process prior to processing each set of images.

Figure 6:
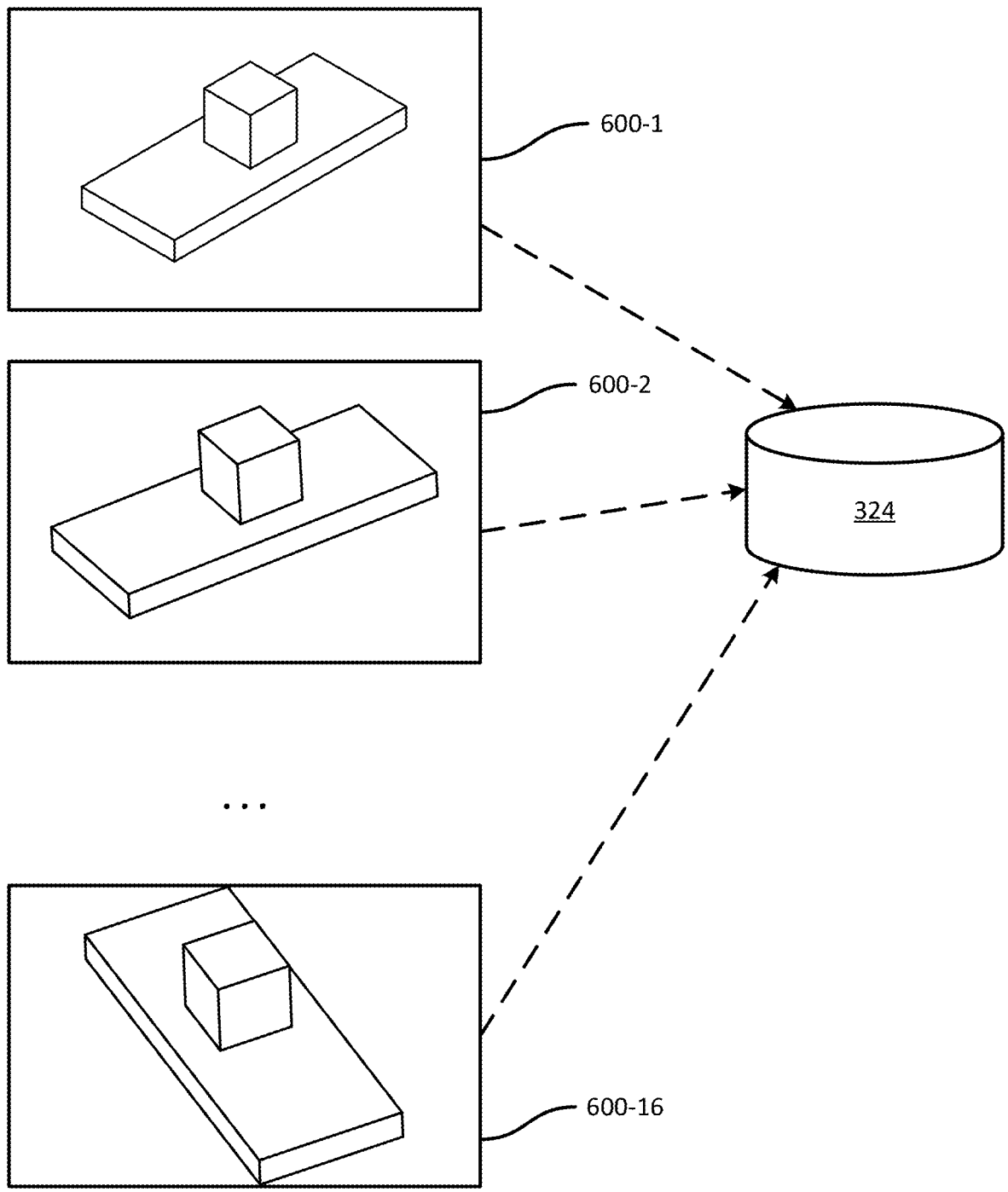
FIG. 6 illustrates example images captured via performance of the method of FIG. 4 in the system of FIGS. 1 and 2.

Turning briefly to FIG. 6, a synchronous set of images 600-1, 600-2, ..., 600-16 (i.e. one image per camera 116) is shown being transferred to the repository 324 responsive to the activation of the dimensioning mode and the shutter command generated and sent at block 420. As is apparent from FIG. 6, the images 600 depict the package 104 from a plurality of perspectives, determined by the positions and orientations at which the cameras 116 are supported by the support structure 204.

Returning to FIG. 4, at block 425, following the initialization discussed above in connection with block 410, the server 112 is configured to determine whether the contents of the repository 324 has been updated. As seen in FIG. 1, the shutter command does not reach the server 112 directly, and the server 112 is therefore configured to detect that images have been captured indirectly. In particular, the monitoring application 316 is configured to determine whether the repository 324 has been updated. In the present example, in which each camera 116 is configured to assign a static file name to captured images, the monitoring application 316 is configured to determine whether the repository 324 has been updated by inspecting timestamps associated with the files stored in the repository 324. For example, Table 1 illustrates a listing of the contents of the repository 324 prior to a performance of block 420 (e.g. following initialization of the repository 324), while Table 2 illustrates a listing of the contents of the repository 324 after the performance of block 420.

TABLE 1

Initial Contents of Repository 324

| File Name | Date/Time Modified |
|---|---|
| IMG_Camera_1.jpg | 5/1/2018 10:01:15.9 AM |
| IMG_Camera_2.jpg | 5/1/2018 10:01:15.9 AM |
| ... | ... |
| IMG_Camera_15.jpg | 5/1/2018 10:01:16.2 AM |
| IMG_Camera_16.jpg | 5/1/2018 10:01:16.2 AM |

TABLE 2

Updated Contents of Repository 324

| File Name | Date/Time Modified |
|---|---|
| IMG_Camera_1.jpg | 5/1/2018 10:01:16.7 AM |
| IMG_Camera_2.jpg | 5/1/2018 10:01:16.7 AM |
| ... | ... |
| IMG_Camera_15.jpg | 5/1/2018 10:01:16.9 AM |
| IMG_Camera_16.jpg | 5/1/2018 10:01:16.2 AM |

As seen above, in both instances the repository 324 contains images having the same file names. However, in Table 2 all but one of the images ("IMG_Camera_16.jpg") bears a different timestamp than those shown in Table 1. The updated timestamps indicate that those images have been overwritten following a performance of block 420 by the controller 140 (which leads to image captures by each camera 116, and transfer of the images to the repository 324). At block 425, the monitoring application 316 is configured to make an affirmative determination only when every image has been overwritten (i.e. when an entire new synchronous set of images has been received). Thus, in the example represented by Tables 1 and 2 above, the determination at block 425 is negative, until the final image is received, leading to an update to the timestamp for the image "IMG_Camera_16.jpg". In other embodiments, the monitoring application 316 is configured to make an affirmative determination when any one of the images in the repository 324 is updated.

In further embodiments, the determination at block 425 need not rely on the detection of timestamp updates. For example, in embodiments in which the images are not written to the repository 324 with static file names, the monitoring application 316 is configured to make an affirmative determination upon detecting new file names in the repository 324 (e.g. at least one new file, a predetermined number of new files, or the like). In further embodiments, the server 112 is configured to examine other suitable metadata associated with the captured images to detect updates to the repository 324. For example, the server 112 can be configured to detect changes in file sizes at block 425.

When the determination at block 425 is negative, the server 112 is configured to return to block 413 to determine whether any potential collisions are detected. As will now be apparent, the monitoring application 316 can also continue to monitor the repository 324 for updates at block 425 substantially in parallel with the performance of block 413. When the determination at block 425 is affirmative, the performance of the method 400 proceeds to block 430.

At block 430, the monitoring application 316 is configured to generate a command to the point cloud generator application 320 to initiate generation of point cloud data based on the set of images detected at block 425. The generation of point cloud data, as noted earlier, is performed via a suitable point cloud generation mechanism and is not discussed in detail herein. In general, the generation of point cloud data at block 435 includes the generation of a plurality of voxels each containing color data (e.g. red, green and blue values, or values corresponding to another suitable color model) and positional data in three dimensions. The positional and color data for the voxels are derived from the images in the synchronous set based on the above-mentioned calibration data. The calibration data is employed to determine positions within the capture volume 208 that are represented by each pixel of each image. In other words, three-dimensional positions may be generated for each pixel in the images. Each distinct three-dimensional position may be stored in a voxel, and color data may be assigned to the voxel based on the color data from one or more pixels corresponding to the three-dimensional position.

The point cloud data generated at block 435 is stored in the memory 304. For example, the point cloud data can be stored in the repository 324, or in a separate repository defined in the memory 304. In examples in which an initial point cloud is generated, the point cloud data generated at block 435 is stored separately from the initial point cloud. However, subsequent performances of block 435 may lead to point cloud data from previous performances of block 435 being overwritten.

At block 440, the point cloud data generated at block 435 is employed to obtain dimensions for the package 104. In the present example, the server 112 is configured to transmit the point cloud data transmitted to the dimensioning server 108 via the network 110, and the dimensioning server 108 is configured to detect the representation of the package 104 in the point cloud data and to determine dimensions for the package 104. The dimensioning server 108 can be configured to employ any suitable dimensioning operation, or set of operations, to determine the package dimensions from the point cloud (e.g. a suitable combination of cluster detection algorithms such as Euclidean cluster extraction, and edge detection algorithms to detect edges of the package in a cluster, such as random sample consensus (RANSAC)). In other examples, some or all of the functionality of the dimensioning server 108 is implemented within the server 112. For example, the server 112 can include a dimensioning application (not shown) configured to detect edges or other features within the point cloud data and compute the dimensions of such features. The dimensions obtained from the point cloud data may be returned to the server 112, presented on a display coupled to the server 112 or the dimensioning server 108, or the like. The dimensions may also be transmitted to a further computing device, for example for the determination of transport or storage pricing, for spatial optimization processing or the like. Following the performance of block 440, the server 112 is configured to return to block 413.

Variations to the above systems and methods are contemplated. For example, in some embodiments the dual connectors 120 may be omitted. In such embodiments, connections between the cameras 116 and the server 112 may be implemented according to a suitable wired (e.g. USB, Thunderbolt™) or wireless (e.g. Bluetooth™, Wi-Fi) connection. Connections between the cameras 116 and the controller 140 may be implemented according to another suitable wired or wireless connection.

In some embodiments, the controller 140 is implemented as two or more physical devices, for example when the interface 358 of a single device does not include a sufficient number of contacts to establish connections with all of the cameras 116, as well as the power switch 148 and the motion sensor 144. In such embodiments, each segment 132 may be split into two or more segment, with certain control conduits (e.g. shutter and auto-focus) being connected to a first controller 140, and other control conduits (e.g. power switching for the cameras 116) being connected to a second controller 140. The controllers 140 are in communication with one another in such embodiments, for example via a wired (e.g. Ethernet) or wireless (e.g. Wi-Fi, Bluetooth™) connection.

Figure 7:
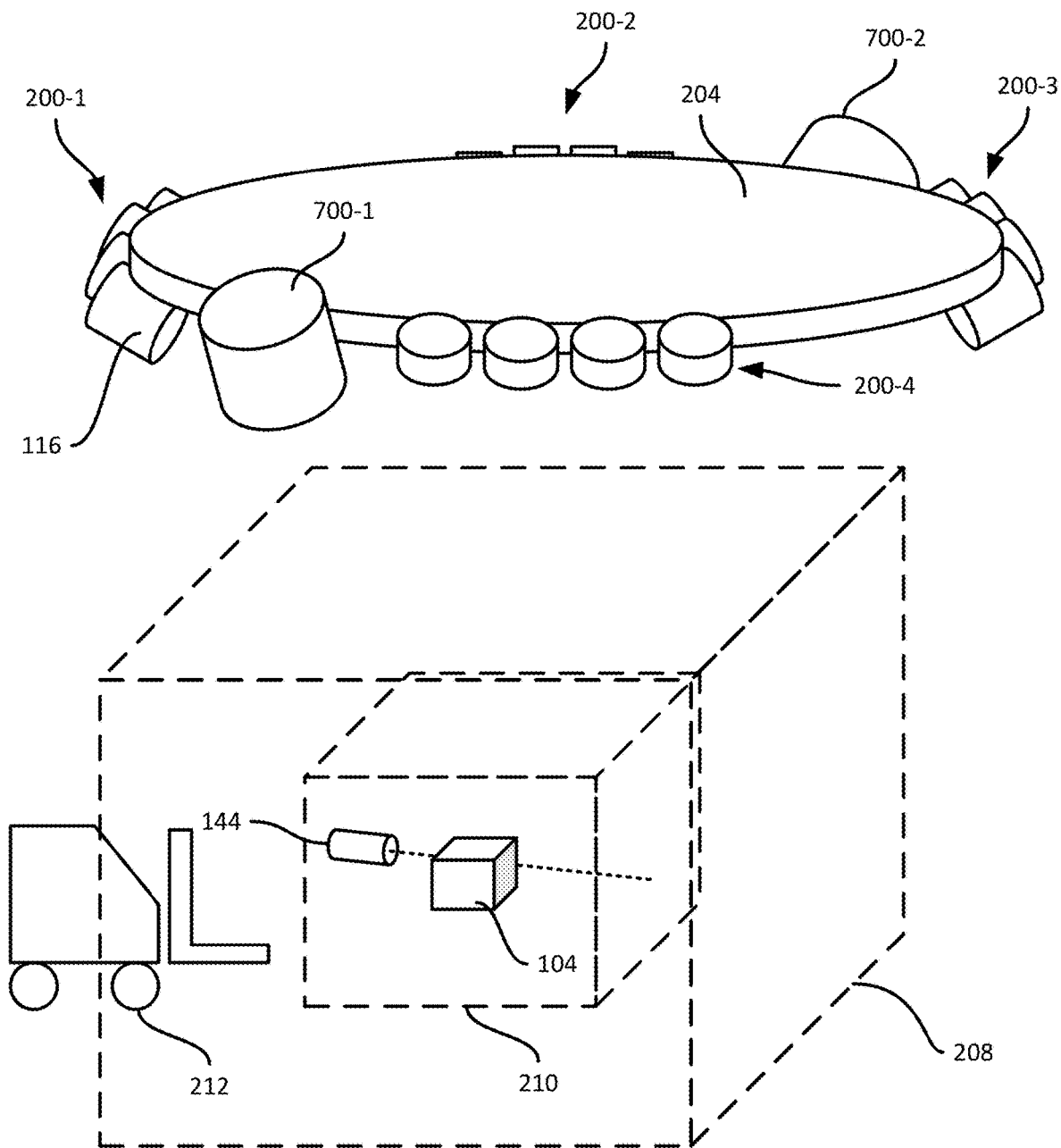
FIG. 7 is a diagram of another example deployment of certain components of the system of FIG. 1.

In further embodiments, the system 100 includes one or more projectors arranged to illuminate the capture volume 208, for example with structured light detectable by the cameras 116. For example, as shown in FIG. 7, the system 100 may include a first projector 700-1 and a second projector 700-2 supported by the support structure 204 to illuminate the capture volume 208.

Figure 8:
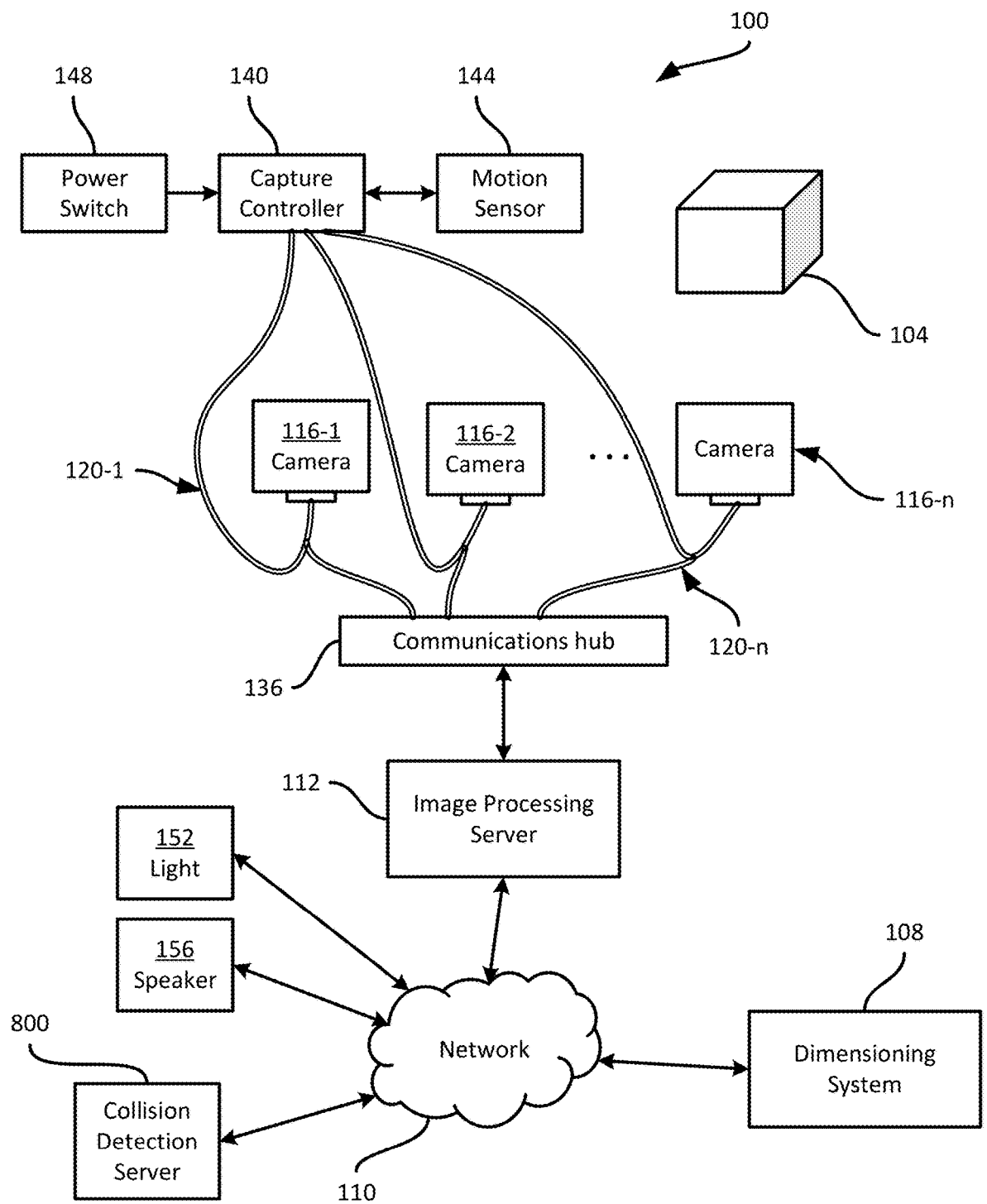
FIGS. 8-9 are schematics of dual-mode data capture systems for collision detection and object dimensioning, according to additional embodiments.

In other embodiments, referring to FIG. 8, the system 100 includes a collision detection server 800 connected to the network 110. In such embodiments, the collision detection server 800 hosts the repository 326 and executes the application 322. That is, the collision detection server 800 implements the collision detection functionality discussed above in connection with blocks 413 and 414, while the image processing server 112 implements the point cloud generation for dimensioning, as discussed above in connection with blocks 425-440.

Figure 9:
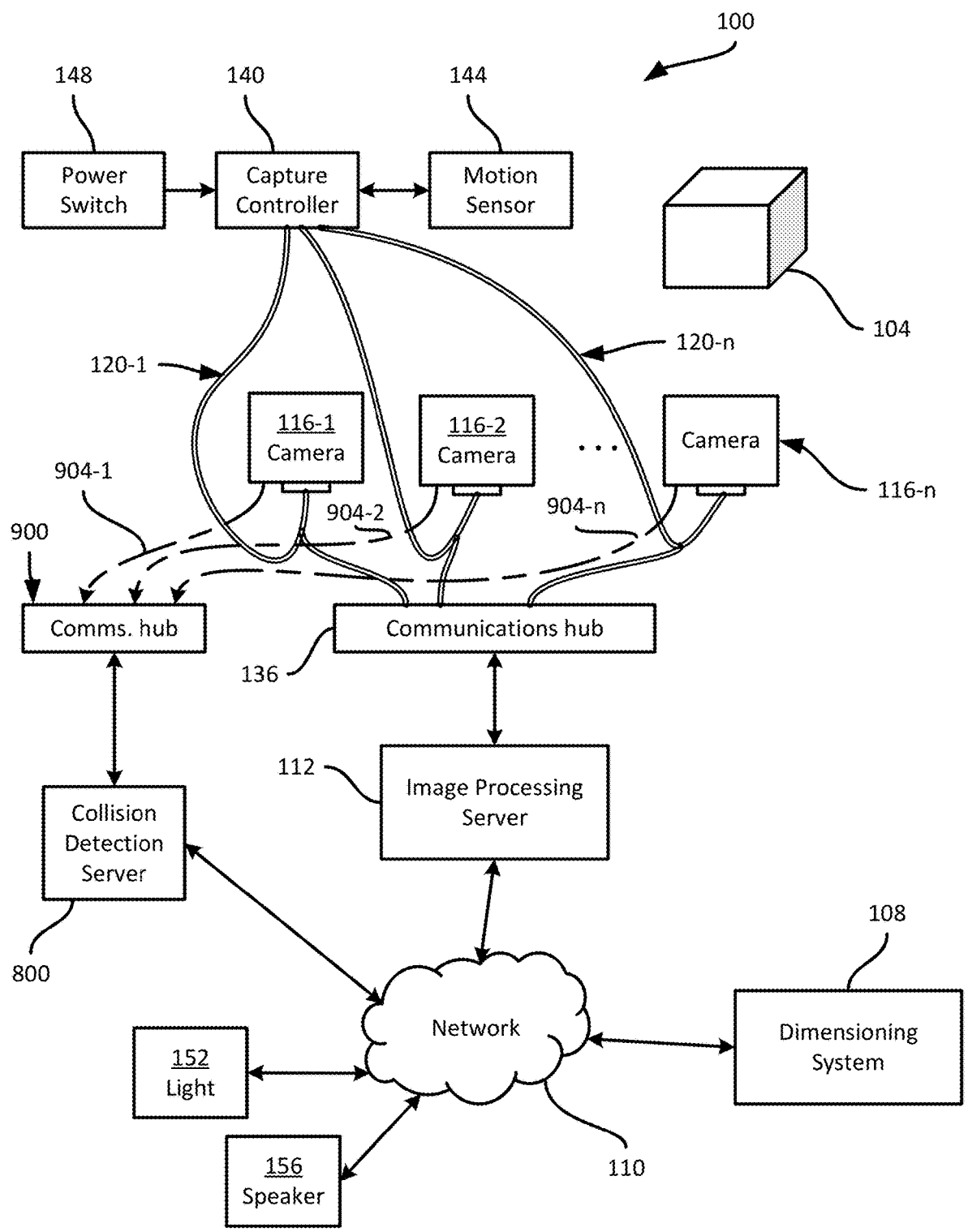

In further embodiments, referring to FIG. 9, as noted above the cameras 116 can be connected to the server 112 and/or the server 800 via more than one interface. In particular, the system 100 as shown in FIG. 9 includes a secondary communications hub 900, such as a keyboard, video and mouse (KVM) switch or the like, having a plurality of video inputs such as HDMI inputs for receiving video connectors 904-1, 904-2, . . . 904-n from the cameras 116. The hub 900 can be connected to an I/O interface (e.g. a USB port or the like). In such embodiments, as mentioned earlier, the cameras 116 can be controlled to transfer images to the repository 324 or the repository 326 by switching capture modes. For example, the video capture mode of the cameras 116 can be configured to transfer images via HDMI output, which therefore transfers images to the server 800 via the hub 900. The cameras 116 can be further configured to transfer images in the single-frame capture mode via USB, which therefore transfers images to the server 112 via the hub 136.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A dual-mode data capture system, comprising:
   a plurality of cameras disposed to view a capture volume;
   a motion sensor configured to generate a detection signal responsive to detecting an object at a capture position within the capture volume;
   a capture controller connected to the motion sensor and configured to:
      activate at least a subset of cameras in a collision detection mode causing the subset of cameras to capture respective sequences of images of the capture volume, the subset of cameras being a subset of the plurality of cameras;
      responsive to receiving the detection signal, activate the plurality of cameras in a dimensioning mode causing each camera to capture a respective synchronous set of images of the capture position;
   a collision detector connected to at least the subset of cameras and configured to:
      receive the respective sequences of images;
      determine whether the respective sequences of images from at least the subset of the plurality of cameras indicate a potential collision of one or more objects in the capture volume; and
      responsive to detection of the potential collision, generate a warning; and
   a point cloud generator connected to each of the plurality of cameras and configured to receive the synchronous set of images of the capture position from the plurality of cameras and generate a point cloud representing the object based on the synchronous set of images of the capture position from the plurality of cameras, wherein dimensions of the object are determined based on the point cloud.

2. The dual-mode data capture system of claim 1, wherein the capture controller is further configured, following activation of the cameras in the dimensioning mode, to return the subset of cameras to the collision detection mode.

3. The dual-mode data capture system of claim 2, wherein the collision detection mode is activated for a first time period.

4. The dual-mode data capture system of claim 3, wherein the dimensioning mode is activated for a second time period, the second time period being shorter than the first time period.

5. The dual-mode data capture system of claim 1, wherein the capture controller is further configured, for activating the cameras in the dimensioning mode, to:
   generate and transmit a shutter command substantially simultaneously to each of a plurality of cameras that causes each camera to capture a respective synchronous set of images of the capture volume.

6. The dual-mode data capture system of claim 1, wherein the point cloud generator is configured to receive the synchronous set of images of the capture position from the plurality of cameras, and to store the synchronous set of images in a first repository.

7. The dual-mode data capture system of claim 6, wherein the collision detector is configured to receive the respective sequences of images from the subset of cameras, and to store the respective sequences of images in a second repository.

8. The dual-mode data capture system of claim 1, further comprising an output device for generating a warning signal; wherein the collision detector is configured to generate the warning by transmitting a command to the output device.

9. The dual-mode data capture system of claim 1, wherein the collision detector is configured to determine whether the respective sequences of images indicate a potential collision by:
identifying a first object and a second object in the sequences of images; and
determining a first movement vector corresponding to the first object, and a second movement vector corresponding to the second object.

10. The dual-mode data capture system of claim 1, wherein the collision detector includes a collision detection server connected to the subset of cameras; and
wherein the point cloud generator includes an image processing server connected to each of the plurality of cameras.

11. The dual-mode data capture system of claim 1, further comprising a server executing (i) a collision detection application to implement the collision detector, and (ii) a point cloud generation application to implement the point cloud generator.

12. The dual-mode data capture system of claim 1, wherein the capture controller is configured to activate the subset of the cameras in the collision detection mode by transmitting a command to each of the subset of cameras to switch from a single-frame capture mode to a continuous capture mode.

13. A method of dual-mode data capture, comprising:
at a capture controller connected to a plurality of cameras disposed to view a capture volume, activate at least a subset of cameras in a collision detection mode causing the subset of cameras to capture respective sequences of images of the capture volume, the subset of cameras being a subset of the plurality of cameras;
at a collision detector connected to at least the subset of cameras, receiving the respective sequences of images and determining whether the respective sequences of images from at least the subset of the plurality of cameras indicate a potential collision of one or more objects in the capture volume;
responsive to detection of the potential collision at the collision detector, generating a warning;
at a motion sensor connected to the capture controller, generating a detection signal responsive to detecting an object at a capture position within the capture volume;
at the capture controller, responsive to receiving the detection signal, activating the plurality of cameras in a dimensioning mode causing each camera to capture a respective synchronous set of images of the capture position; and
at a point cloud generator connected to each of the plurality of cameras, receiving the synchronous set of images of the capture position from the plurality of cameras and generating a point cloud representing the object based on the synchronous set of images of the capture position from the plurality of cameras, wherein dimensions of the object are determined based on the point cloud.

14. The method of claim 13, further comprising at the capture controller, following activation of at least the subset of the cameras in the dimensioning mode, returning at least the subset of the cameras to the collision detection mode.

15. The method of claim 14, further comprising activating the collision detection mode for a first time period.

16. The method of claim 15, further comprising activating the dimensioning mode for a second time period, the second time period being shorter than the first time period.

17. The method of claim 13, wherein activating the cameras in the dimensioning mode further comprises:
generating and transmitting a shutter command substantially simultaneously to each of a plurality of cameras that causes each camera to capture a respective synchronous set of images of the capture volume.

18. The method of claim 13, further comprising, at the point cloud generator: receiving the synchronous set of images of the capture position from the plurality of cameras, and storing the synchronous set of images in a first repository.

19. The method of claim 18, further comprising, at the collision detector, receiving the respective sequences of images from the subset of cameras, and storing the respective sequences of images in a second repository.

20. The method of claim 13, wherein generating the warning comprises transmitting a command from the collision detector to an output device.

21. The method of claim 13, wherein determining whether the respective sequences of images indicate a potential collision comprises:
identifying a first object and a second object in the sequences of images; and
determining a first movement vector corresponding to the first object, and a second movement vector corresponding to the second object.

22. The method of claim 13, wherein activating the subset of the cameras in the collision detection mode comprises transmitting a command to each of the subset of cameras to switch from a single-frame capture mode to a continuous capture mode.

23. A non-transitory computer-readable medium storing a plurality of computer-readable instructions executable in a dual-mode data capture system, the instructions comprising:
at a capture controller connected to a plurality of cameras disposed to view a capture volume, activating at least a subset of cameras in a collision detection mode causing the subset of cameras to capture respective sequences of images of the capture volume, the subset of cameras being a subset of the plurality of cameras;
at a collision detector connected to at least the subset of cameras, receiving the respective sequences of images and determining whether the respective sequences of images from at least the subset of the plurality of cameras indicate a potential collision of one or more objects in the capture volume;
responsive to detection of the potential collision at the collision detector, generating a warning;
at a motion sensor connected to the capture controller, generating a detection signal responsive to detecting an object at a capture position within the capture volume;
at the capture controller, responsive to receiving the detection signal, activating the plurality of cameras in a dimensioning mode causing each camera to capture a respective synchronous set of images of the capture position; and
at a point cloud generator connected to each of the plurality of cameras, receiving the synchronous set of images of the capture position from the plurality of cameras and generating a point cloud representing the object based on the synchronous set of images of the capture position from the plurality of cameras, wherein dimensions of the object are determined based on the point cloud.

\* \* \* \* \*